W. L. OWEN.
PROCESS FOR THE PRESERVATION IN STORAGE OF SIRUPS AND MOLASSES.
APPLICATION FILED JULY 31, 1919.
1,418,457.
Patented June 6, 1922.
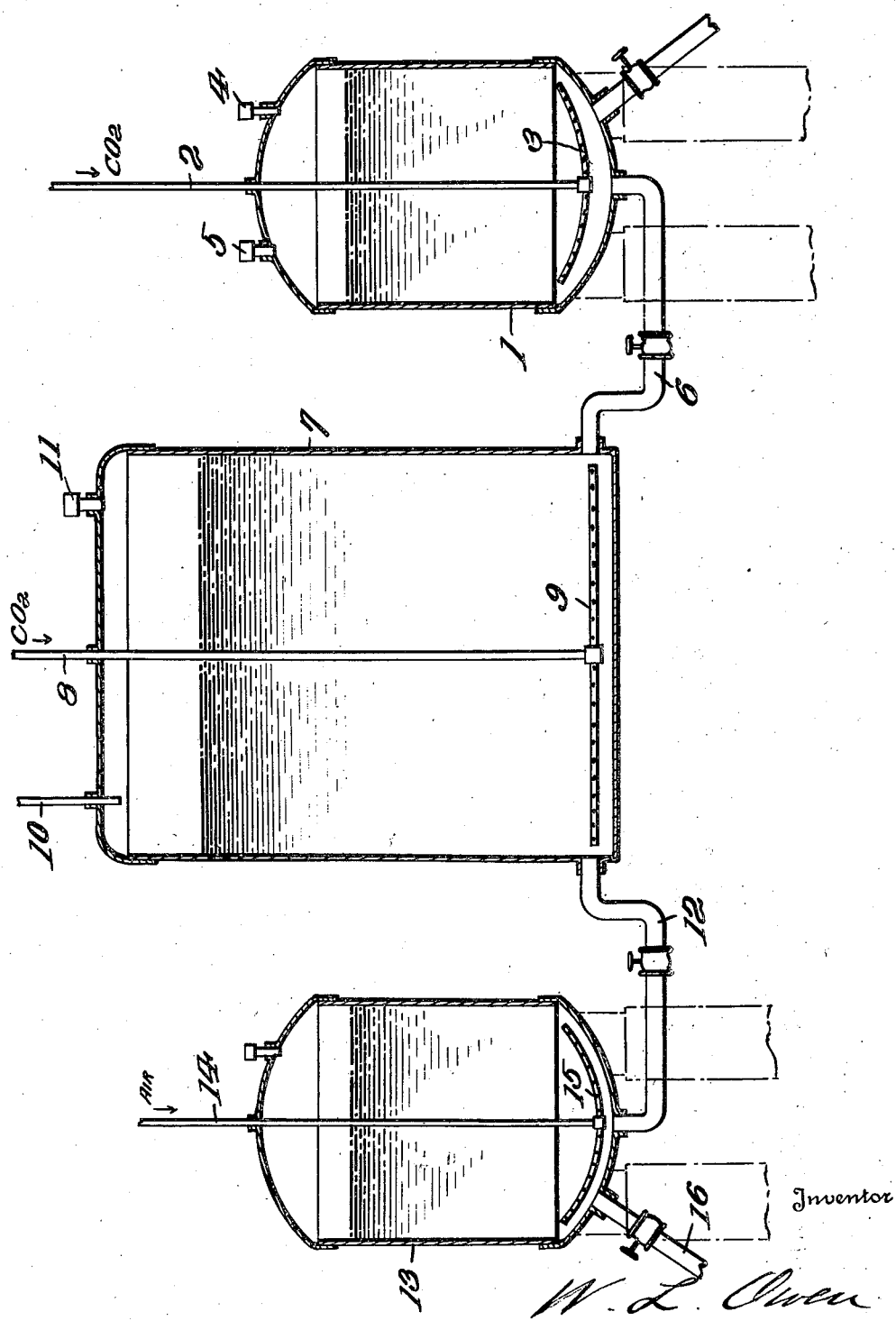

UNITED STATES PATENT OFFICE.

WILLIAM L. OWEN, OF NEW ORLEANS, LOUISIANA, ASSIGNOR, BY MESNE ASSIGNMENTS, TO PENICK & FORD, LTD., INCORPORATED, OF NEW ORLEANS, LOUISIANA, A CORPORATION OF DELAWARE.

PROCESS FOR THE PRESERVATION IN STORAGE OF SIRUPS AND MOLASSES.

1,418,457.      Specification of Letters Patent.      Patented June 6, 1922.

Application filed July 31, 1919. Serial No. 314,563.

*To all whom it may concern:*

Be it known that I, WILLIAM L. OWEN, a citizen of the United States, residing at New Orleans, in the parish of Orleans, State of Louisiana, have invented certain new and useful Improvements in Processes for the Preservation in Storage of Sirups and Molasses, of which the following is a description, reference being had to the accompanying drawing and to the figures of reference marked thereon.

The invention relates to processes for the preservation in storage of sirups and molasses, and more particularly to a process wherein carbon-dioxide gas under pressure is used.

An object of the invention is to suppress fermentation and prevent the decomposition of lime organic combinations in sirup and molasses in storage by displacing the air in and about the same by means of carbon dioxide gas under suitable pressure.

This and other objects will in part be obvious and will in part be hereinafter more fully disclosed;

In the drawing, which shows by way of illustrations one embodiment of the invention:—

The figure illustrates an elevation, partly in section, of one form of apparatus for carrying out my process.

In general the method consists in subjecting the sirup or molasses in a suitable container to carbon-dioxide gas under pressure, and then releasing the pressure within the container until the entrained air is substantially removed, and finally subjecting the same to a maintained pressure of carbon dioxide gas.

In carrying out the process, the sirup or molasses is first introduced into the impregnator 1, comprising a suitably constructed enclosed tank, where it is subjected to a pressure of carbon-dioxide of substantially 75 pounds, injected into the body of molasses or sirup by means of a pipe 2 provided with a suitably formed nozzle 3. The carbon dioxide being injected at the bottom of the contents of the container, thoroughly subjects the molasses to the action of the gas. To remove particles of air in the molasses or sirup, the pressure within the tank is then released, through the release valve 4, and the sirup again subjected to the pressure of the carbon-dioxide, and this treatment is repeated until substantially all of the air contained within the sirup or molasses, and above the same in the tank, is removed. The tank is preferably provided with any desired type of safety valve 5, to prevent the occurrence of an abnormal pressure therein.

The sirup or molasses thus freed of air is transferred, by means of a valved conduit 6, to the storage tank 7, where it is again subjected to a maintained pressure of carbon-dioxide gas injected through a pipe 8 provided with a suitably constructed nozzle 9 extending along the bottom of the tank so as to force the gas under pressure up through the body of the liquid, as above described. In order to maintain the pressure within this tank to the required degree, which in the present case should be about 45 pounds per square inch, there is provided a regulating device of any suitable character, and to this end there is shown a pipe 10 connecting with the uppermost part of the tank and leading to the carbon-dioxide supply pump whereby the pressure within the tank may be automatically controlled. This storage tank is also provided with a safety valve 11.

When it is desired to release the sirup or molasses from storage, the same is conducted, by means of a valved conduit 12, to the carbon-dioxide eliminator which comprises a tank 13 into which is injected compressed air by means of a pipe 14, also formed with a nozzle 15 at the base thereof which is adapted to inject air up through the body of the liquid. The eliminator is further provided with a valved outlet 16 for withdrawing the sirup or molasses to be further processed and canned.

It will be evident that instead of repeatedly subjecting the molasses to pressure of the carbon-dioxide and alternately releasing the pressure within the impregnator 1 to gradually displace the entrained air with carbon-dioxide, a substantially similar result may be accomplished by continuously subjecting the liquid to the pressure of carbon-dioxide and permitting the entrained air thus gradually diluted to continuously escape through the release valve 4. After air has been thus substantially removed or displaced, the liquid can be transferred as aforesaid to the storage tank, and there subjected to the maintained pressure of carbon-dioxide, as heretofore stated.

It is obvious that minor changes in the details of this process may be made without departing from the spirit of the invention as set forth in the appended claims.

Having thus described the invention, what I claim as new and desire to secure by Letters Patent is:—

1. The process of preserving molasses or the like in storage consisting in subjecting it to carbon dioxide gas under pressure to substantially displace the entrained and environmental air and finally storing the molasses under pressure by subjecting it to a maintained pressure of carbon dioxide gas of at least forty-five pounds.

2. The process of preserving molasses or the like in storage consisting in alternately injecting carbon dioxide gas under pressure in a spray form at the base of the liquid in a closed container whereby the gas passes upwardly therethrough and carries the entrained air along therewith and releasing the gas and air from the container, and thereafter storing the molasses under pressure by subjecting it to a maintained pressure of carbon dioxide gas of substantially forty-five pounds.

3. The process of preserving molasses or the like in storage consisting in subjecting it to a pressure of carbon dioxide gas to substantially remove the air therefrom, transferring the treated liquid to a connected tank in which it is stored while subjected to a maintained pressure of carbon dioxide gas of substantially forty-five pounds and finally transferring the liquid to a connected tank and subjecting the liquid to compressed air to remove the entrained carbon dioxide.

In testimony whereof, I affix my signature.

WM. L. OWEN.